Figure 1:
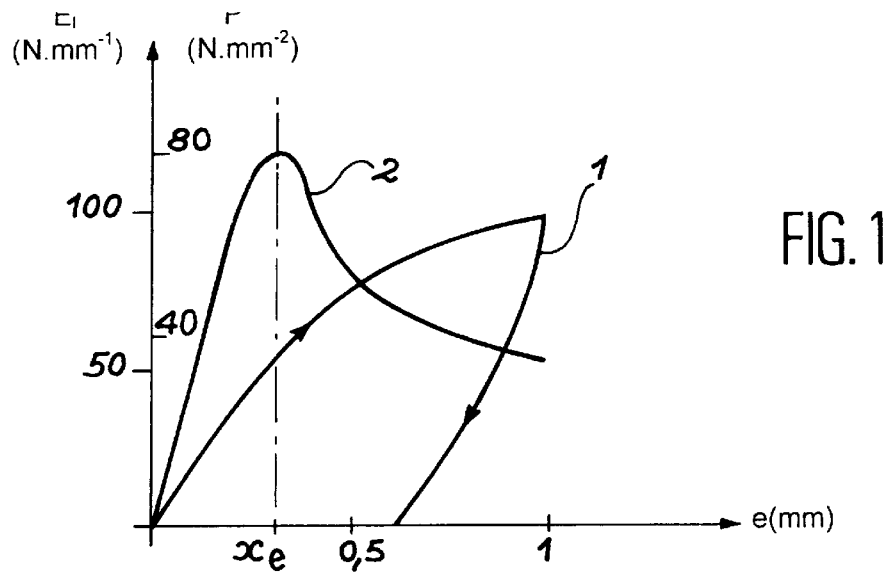

United States Patent [19]
Caplain et al.

[11] Patent Number: 6,098,989
[45] Date of Patent: Aug. 8, 2000

[54] COMPOSITE METALLIC TYPE SEAL WITH SPIRAL SPRINGS, AND MANUFACTURING PROCESS FOR THIS SEAL

[75] Inventors: Philippe Caplain, Saint Paul Trois Chateaux; Christian Rouaud, Bourg Saint Andeol, both of France

[73] Assignee: Commissariat A l'Energie Atomique, Paris, France

[21] Appl. No.: 09/100,520

[22] Filed: Jun. 19, 1998

[30] Foreign Application Priority Data

Jun. 25, 1997 [FR] France .................................. 97 07923

[51] Int. Cl.⁷ ...................................................... F16J 15/28
[52] U.S. Cl. ............................................. 277/541; 277/910
[58] Field of Search ..................................... 277/535, 538, 277/910, 541

[56] References Cited

U.S. PATENT DOCUMENTS

| | | | |
|---|---|---|---|
| 1,490,716 | 4/1924 | Schwennker. | |
| 3,111,324 | 11/1963 | Wiltse | 277/910 X |
| 3,406,979 | 10/1968 | Weber | 277/910 X |
| 5,358,262 | 10/1994 | Roberts | 277/910 X |

FOREIGN PATENT DOCUMENTS

| | | |
|---|---|---|
| 378436 | of 0000 | European Pat. Off. . |
| 2180400 | of 0000 | France . |
| 2524113 | of 0000 | France . |
| 2256487 | of 0000 | Germany . |
| 2527389 | of 0000 | Germany . |
| 314987 | of 0000 | Switzerland . |
| 2041112 | of 0000 | United Kingdom . |

*Primary Examiner*—Anthony Knight
*Assistant Examiner*—Karlena D. Schwing
*Attorney, Agent, or Firm*—Pearne & Gordon LLP

[57] ABSTRACT

This invention relates to a sealing O-ring of the composite metallic type with a metallic torus-shaped hollow central body (31), and at least one metallic sheet (32) surrounding this metallic body. The central body (31) is composed of a sequence forming a spiral spring with an overlap and laid out along the circumferences of meridian circles of the torus, forming a spiral spring being side by side but not touching each other.

8 Claims, 3 Drawing Sheets

COMPOSITE METALLIC TYPE SEAL WITH SPIRAL SPRINGS, AND MANUFACTURING PROCESS FOR THIS SEAL

This invention relates to a composite metallic type seal with spring. It also relates to a process for manufacturing this type of seal.

In the field of static seals, for example comprising bolted type assemblies or screwed couplings with seals, flexible metallic O-rings have been developed over the past 30 years based on separation of the mechanical, elasticity and sealing functions. This principle has led to the use of a closed tube or an open tube as an elastic core (C-shaped section) usually made from spring materials with a high yield stress, and surrounding this elastic system either with independent thin sheets made of a ductile metal, or a surface coating that bonds directly onto the substrate. There is also a composite O-ring in which the central body is made of a helical spring with adjacent turns closed on itself and surrounded on the outside by a metallic sheet ("Helicoflex" seal made by CEFILAC).

This design produces seals with very high sealing performances, but the tightening forces need to be increased in a ratio of between 5 and 40 times greater than what is necessary for O-rings made of an elastomer. Obviously the seal efficiency drops if the forces are reduced.

If the mechanical behavior of these seals is examined, in other words if the relation between the linear force $E_1$ exerted on the seal to tighten it and its compression e are measured, then the characteristic curve obtained is like curve 1 shown in the diagram in FIG. 1. If we superpose the variation of the specific contact pressure P on the same diagram, in other words the ratio between the linear force and the contact width between the O-ring and the seal contact surface, a bell-shaped curve is obtained like curve 2 shown in the diagram in FIG. 1. Curve 2 shows that the specific pressure increases very quickly in the first tenths of the O-ring compression, passes through a maximum and then decreases very quickly. This is a major disadvantage since there is a risk of damaging the seal for a compression compatible with normal seal housing tolerances.

All these metallic seals, which have an elastic O-ring core, have something in common, namely that their section becomes oval under the effect of the applied force. Due to the increase in the radius of curvature (Hertz's expression), this ovalling increases the contact area between the seal and its contact surface and therefore reduces the specific contact pressure. The slope of curve 1 drops very quickly beyond a compression value $X_e$ (see FIG. 1), whereas the radius of curvature increases.

This invention was designed to overcome ovalling of the O-ring section during compression of composite metallic seals with springs. Therefore, it prevents the reduction in the contact pressure so that the global force may be low.

More precisely, the objective is to cancel, or even inverse, the variation in the radius of curvature at contact points between the seal and the contact surface of the elastic element submitted to a radial force. Tightening a seal with a C-shaped section makes the generating circle become oval, which in particular results in an increase in the radius of curvature C at the contact points between the seal and the contact surface. The variation of this radius of curvature then increases monotonously with the tightening force.

The purpose of the invention is a composite metallic type sealing O-ring with a metallic torus-shaped hollow central body and at least one metallic sheet surrounding this central body, characterized in that the central body is composed of a series of means forming a spiral spring with an overlap and laid out along the circumferences of meridian circles of the torus, these means forming a spiral spring being placed side by side but not touching each other.

According to the invention, the force to wind the turns on themselves reduces the radius of curvature of the central body at the contact points between the seal and the contact surface. The variation of this radius of curvature is then a monotonously decreasing function of the tightening force.

The sealing O-ring according to this invention is functionally different from an O-ring using an open tube with a C-shaped section as an elastic core, even when the C is almost closed. In this case, the effect procured by the invention cannot be obtained, since when tightening this seal made according to known practice, there would be hammering of the metal (or elongation depending on the position of the axis of the seal) at the closure of the two ends of the C. Therefore, the invention shows that there must be a circumferal discontinuity in the elastic element to facilitate closure of the section of the central body on itself. This discontinuity is achieved if the means forming the said spiral spring have side by side turns that do not touch. In this configuration, the operation of the central body may be compared with the deformation of a spiral spring, for each turn.

According to a first embodiment, the said means forming a spiral spring are composed of parallel strips wound on themselves, and for which the main surfaces create the torus shape of the central body. Parallel strips may be connected together by a metallic continuity. Thus, a comb-shape can be obtained for the central body when it is laid out flat.

According to a second embodiment, the means forming a spiral spring may be metallic wires. Advantageously, the metallic wires may be parts made of the same length of wire which, if this wire length is laid out flat, would form the straight parts of a zigzag configuration, this zigzag configuration being wound in the form of a cylinder and the ends of this cylinder being connected to form the said torus.

Another purpose of the invention is a process for manufacturing a sealing O-ring of the composite metallic type, comprising a step consisting of making a hollow central torus-shaped metallic body and a step consisting of surrounding this central body with at least one metallic sheet, characterized in that the step making the central body comprises the following operations:

partial cutout of a metallic sheet with appropriate dimensions to give parallel strips joined together by a metallic continuity perpendicular to the said strips, winding of the metallic sheet on itself around an axis parallel to the metallic sheet and perpendicular to the said strips to obtain a cylinder, until the strips overlap on themselves, joining the two ends of the cylinder to obtain the torus-shaped metallic central body.

Finally, another purpose of the invention is a process for manufacturing a sealing O-ring of the composite metallic type, including a step of making a hollow central torus-shaped metallic body and a step consisting of surrounding this central body with at least one metallic sheet, characterized in that the step making the metallic central body comprises the following operations:

shaping a length of metallic wire to obtain a zigzag configuration comprising straight parts approximately parallel to each other when the wire length is laid out flat, and connecting parts to connect each straight part to the previous straight part and to the next straight part, winding of the configuration obtained above on itself, around an axis parallel to the length of the formed wire and perpendicular to the said straight parts, to obtain a cylinder with alternate interlocking of the connecting parts, joining the two ends of the cylinder to obtain the torus shape of the metallic central body.

Figure 2A:
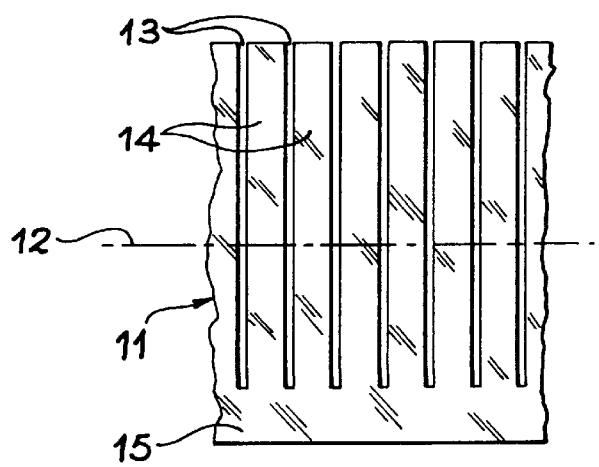
Figure 2B:
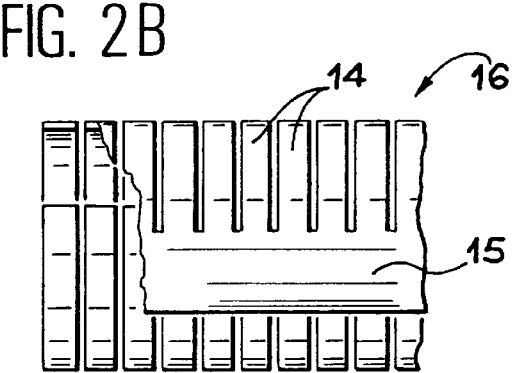
Figure 2C:
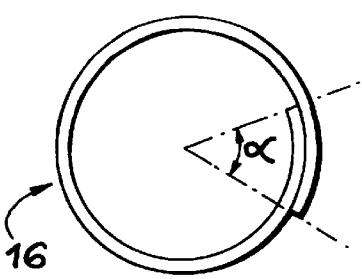
Figure 3A:
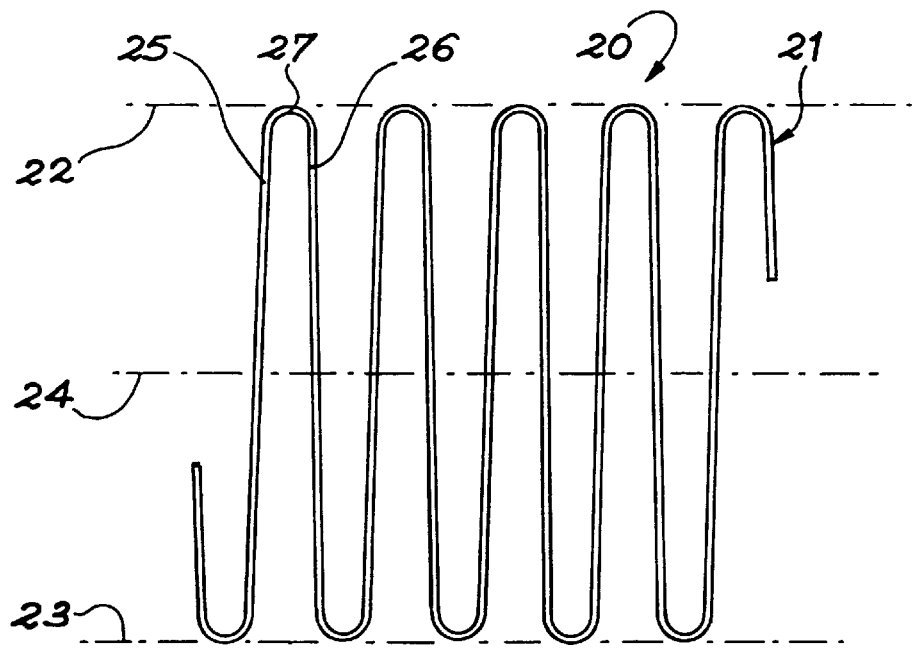
Figure 3B:
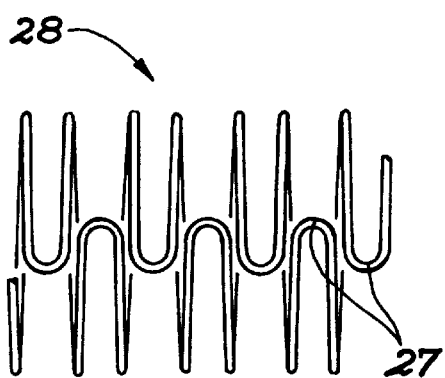
Figure 3C:
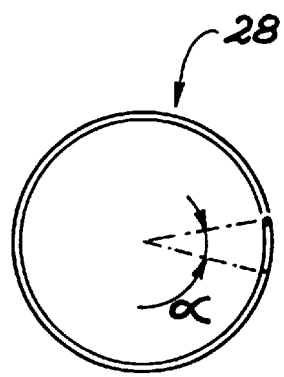
Figure 4:
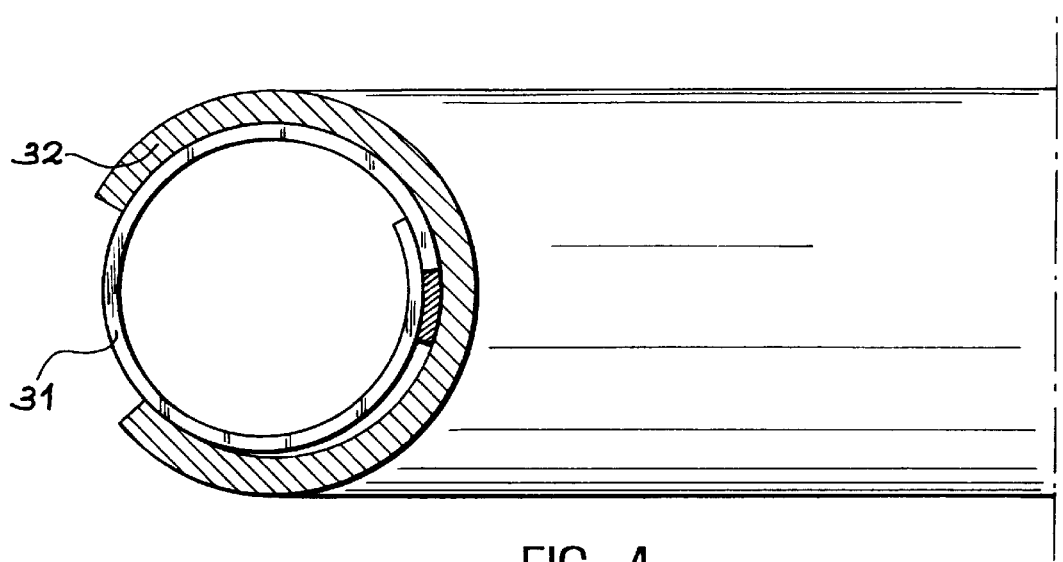
Figure 5:
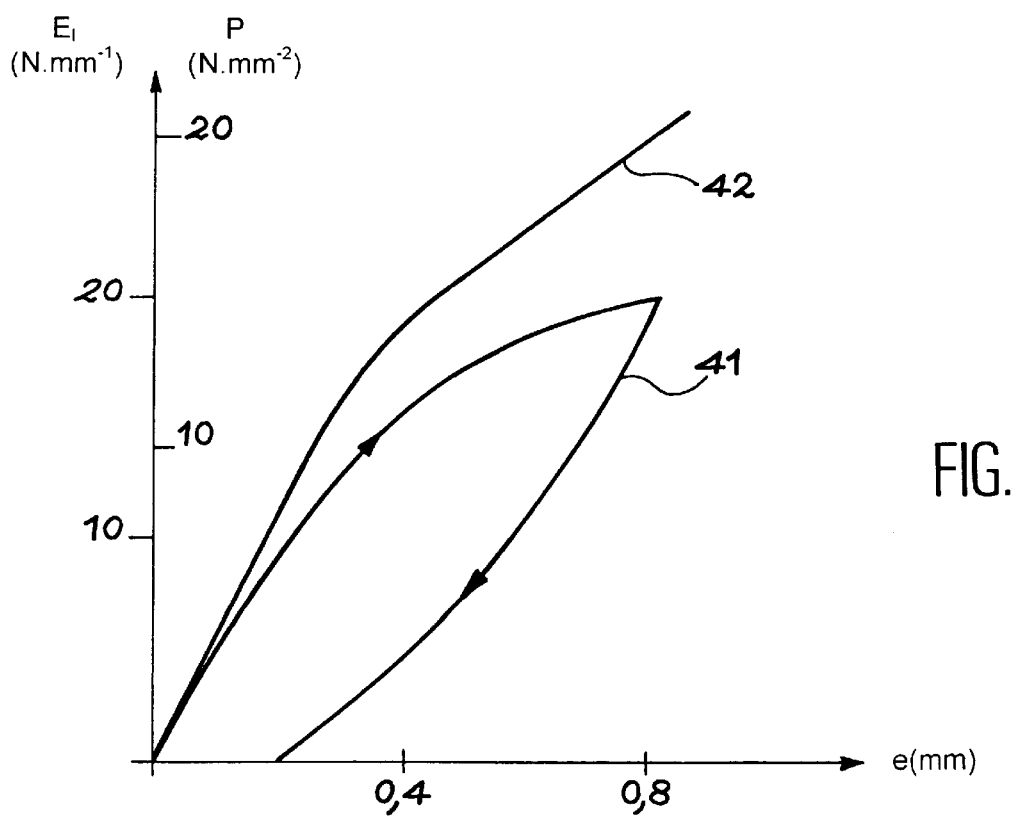

The invention will be better understood, and other details and specific features will become apparent, when reading the following description which is given as a non-restrictive example, accompanied by the attached drawings which:

FIG. 1 is a diagram illustrating the characteristics of an O-ring according to prior art, FIG. 2A, 2B and 2C illustrate a first variant of the central body for a sealing O-ring according to this invention, FIGS. 3A 3B and 3C illustrate a second variant of the central body for an O-ring according to this invention, FIG. 4 a partial sectional view of an O-ring according to this invention, FIG. 5 is a diagram illustrating the characteristics of the O-ring according to this invention.

In a first variant embodiment, the central body of the O-ring may be made from a metallic sheet cutout as shown in FIG. 2A. This figure shows a sheet 11, for example made of steel, with a longitudinal axis 12. Cutouts 13 have been made in sheet 11 perpendicular to the axis 12 and starting from the same edge of the sheet. This thus gives a series of parallel strips 14 with the same width. Two consecutive strips are separated by a given distance corresponding to the cutout 13. The cutouts 13 leave a metallic continuity (or heel) 15. Therefore, the cutout metallic sheet is in the form of a thin comb with a heel reduced to the minimum width necessary, the function of which is joining mechanically the strips 14 together to distribute them uniformly around the circumference of the torus. This heel may be located elsewhere than on the periphery, for example in the middle of the comb.

By winding the metallic sheet 11 on itself around the axis 12, a cylinder 16 is obtained which is shown as a side view in FIG. 2B. The winding is made so as to obtain partial overlap of the metallic sheet. This overlap can be seen better in FIG. 2C which is a view of the cylinder 16 at one of its ends. This overlap at an angle α is essential to initiate winding the spiral spring around itself, by reducing the developed length of the generating circle.

According to a second variant embodiment, the central body of the O-ring may be made from metallic wire, for example made of steel, with a circular cross-section. The wire is firstly formed on a plane surface to obtain the zigzag configuration 20 shown in FIG. 3A. This figure shows that the zigzag configuration of the metallic wire 21 is made between the two parallel axes 22 and 23 located on each side of the axis 24. Each loop in the zigzag configuration comprises straight parts 25 and 26 approximately parallel to each other, and therefore approximately perpendicular to the axis 24 joined by a short connecting part 27.

By winding the zigzag configuration 20 on itself around axis 24, a cylinder 28 is obtained, which is shown in a side view in FIG. 3B. The winding is made so as to obtain an alternate interlocking of the connecting parts 27.

FIG. 3C is a view of the cylinder 28 at one of its ends. It shows the angle α corresponding to interpenetration of rectilinear parts.

The cylinders obtained using either of the variants are then deformed so as to join their ends and obtain a torus shape. The central body obtained can then be covered by one or several skins to give a O-ring with low stiffness according to the invention. The skin material is preferably chosen to be a ductile metal such as indium, tin, lead, gold, aluminum or an alloy of one of these metals.

The opening of the spiral spring may be oriented indifferently depending on the application and must never oppose compression by winding.

FIG. 4 illustrates a complete O-ring according to the invention. It is shown as a partial sectional view. The section shows the metallic central body 31 with elements forming the spiral springs, for example like the first variant embodiment described above. This metallic central body 31 is encased in a ductile metallic skin 32, which has an open generating circle.

The characteristic diagram of this type of seal is given in FIG. 5. By comparison with the diagram recorded for a seal according to known practice and shown in FIG. 1, it is seen that the compression-decompression cycle described by curve 41 has a low permanent deformation after decompression. Unlike the spring in seals according to known art which become oval, the spiral spring in the seal according to the invention remains practically in the elastic phase of the spring. Furthermore, the specific contact pressure at the interface, described by curve 42 is always strictly increasing, therefore there is no risk of the seal being damaged by excessive compression.

In particular, this type of seal may be used:

in surface treatment installations using PVD (Physical Vapour Deposition) and CVD (Chemical Vapour Deposition) methods for the semi-conductor industry;

in the vacuum and ultra vacuum industry, and particularly accelerators and experimental physics laboratories;

more generally, all installations that use elastomer seals as static seal elements, the invention advantageously replacing elastomer seals and limiting pollution risks by eliminating degassing and aging phenomena, without modifying the tightening capacity of the assembly.

What is claimed is:

1. Sealing O-ring of the composite metallic type with a metallic torus-shaped hollow central body, and at least one metallic sheet surrounding this metallic body, in which the central body is composed of a sequence of means forming a spiral spring with overlap and placed around the circumferences of the meridian circles of the torus, these means forming a spiral spring being side by side but not touching each other.

2. Sealing O-ring according to claim 1, in which the said means forming a spiral spring are composed of parallel strips wound on themselves, the main surfaces of which give the torus shape to the central body.

3. Sealing O-ring according to claim 2, in which the parallel strips are connected together by a metallic continuity.

4. Sealing O-ring according to claim 3, in which the parallel strips and the metallic continuity result in the central body having a comb-shape when it is laid out flat.

5. Sealing O-ring according to claim 1, in which the means forming the spiral spring are metallic wires.

6. Sealing O-ring according to claim 5, in which the said metallic wires are parts made from a single length of wire which, if this length of wire was laid out flat, would form the straight parts of a zigzag configuration, this zigzag configuration being wound in the form of a cylinder and the ends of this cylinder being connected to form the said torus.

7. Process for manufacturing a sealing O-ring of the composite metallic type, comprising a step consisting of making a hollow central torus-shaped metallic body and a step consisting of surrounding this central body with at least one metallic sheet, in which the step making the central body comprises the following operations:

partial cutout of a metallic sheet with appropriate dimensions to give parallel strips joined together by a metallic continuity perpendicular to the said strips, winding of the metallic sheet on itself around an axis parallel to the metallic sheet and perpendicular to the said strips to obtain a cylinder, until the strips overlap on themselves, joining the two ends of the cylinder to obtain the torus-shaped metallic central body.

8. Process for manufacturing a sealing O-ring of the composite metallic type, including a step making a hollow central torus-shaped metallic body and a step consisting of surrounding this central body with at least one metallic sheet, characterized in that the step making the metallic central body comprises the following operations:

shaping a length of metallic wire to obtain a zigzag configuration comprising straight parts approximately parallel to each other when the wire length is laid out flat, and connecting parts to connect each straight part to the previous straight part and to the next straight part, winding of the configuration obtained above on itself, around an axis parallel to the length of the formed wire and perpendicular to the said straight parts, to obtain a cylinder with alternate interlocking of the connecting parts, joining the two ends of the cylinder to obtain the torus shape of the metallic central body.

* * * * *

UNITED STATES PATENT AND TRADEMARK OFFICE
CERTIFICATE OF CORRECTION

PATENT NO.   :   6,098,989
DATED        :   August 8, 2000
INVENTOR(S)  :   Caplain et al.

It is certified that error appears in the above-indentified patent and that said Letters Patent is hereby corrected as shown below:

On Drawings Sheet 1 of 3, Figure 1, line 1,
    delete "$c_1$" and insert --$E_1$--.

On Drawings Sheet 1 of 3, Figure 1, line 1,
    delete "r" and insert --P--.

Signed and Sealed this

Twenty-fourth Day of April, 2001

Attest:

NICHOLAS P. GODICI

Attesting Officer       Acting Director of the United States Patent and Trademark Office